United States Patent
Chen et al.

(10) Patent No.: US 8,514,993 B2
(45) Date of Patent: *Aug. 20, 2013

(54) METHOD FOR FREQUENCY OFFSET ESTIMATION AND AUTOMATIC FREQUENCY CONTROL FOR FILTERED SIGNAL WITH DESTROYED PHASE INFORMATION AND SIGNAL TRANSCEIVER

(75) Inventors: YingYing Chen, Taipei (TW); Ho-Chi Huang, Jhudong Township, Hsinchu County (TW); Chun-Ming Kuo, Jhonghe (TW); Shih-Chi Shen, Sindian (TW); JengYi Tsai, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,056

(22) Filed: Jun. 6, 2012

(65) Prior Publication Data
US 2012/0250741 A1 Oct. 4, 2012

Related U.S. Application Data

(63) Continuation of application No. 12/178,674, filed on Jul. 24, 2008, now Pat. No. 8,218,698.

(60) Provisional application No. 61/012,074, filed on Dec. 7, 2007.

(51) Int. Cl.
*H04B 1/10* (2006.01)

(52) U.S. Cl.
USPC ........... 375/350; 375/219; 375/260; 375/262; 375/267; 375/295; 375/344; 375/345

(58) Field of Classification Search
USPC ................ 375/219, 296, 350, 260, 262, 267, 375/295, 345, 346; 370/203, 204, 205, 208, 370/209, 210
See application file for complete search history.

(56) References Cited

U.S. PATENT DOCUMENTS

| | | | |
|---|---|---|---|
| 5,423,085 A | 6/1995 | Lim | |
| 6,778,613 B2 * | 8/2004 | Avidor et al. | 375/329 |
| 7,079,605 B1 * | 7/2006 | Isaksen et al. | 375/344 |
| 7,133,657 B2 | 11/2006 | Kuenen et al. | |

(Continued)

FOREIGN PATENT DOCUMENTS

| EP | 1 793 551 | 6/2007 |
|---|---|---|
| WO | WO 2006/093332 | 9/2006 |

*Primary Examiner* — Dhaval Patel
(74) *Attorney, Agent, or Firm* — McClure, Qualey & Rodack, LLP

(57) ABSTRACT

The invention provides a method for frequency offset estimation according to a filtered signal with destroyed phase information. In one embodiment, a filter filters an original signal according to a series of first filter coefficients to obtain a first-channel component of the filtered signal, and filters the original signal according to a series of second filter coefficients to obtain a second-channel component of the filtered signal. A series of third filter coefficients are first derived from the first filter coefficients. The original signal is then filtered according to the third filter coefficients to obtain a reference signal. A first frequency offset value is estimated according to the first-channel component of the filtered signal and the reference signal, wherein the first-channel component of the filtered signal is a first-channel component of an artificial signal, and the reference signal is a second-channel component of the artificial signal.

28 Claims, 7 Drawing Sheets

(56) References Cited

U.S. PATENT DOCUMENTS

| | | |
|---|---|---|
| 7,333,573 B2 | 2/2008 | Higure |
| 7,627,047 B2 | 12/2009 | Tsuruta et al. |
| 7,796,708 B2 * | 9/2010 | Yehudai ............... 375/324 |
| 2003/0087617 A1 | 5/2003 | Shohara |
| 2006/0115011 A1 | 6/2006 | Tsuruta et al. |
| 2007/0237209 A1 | 10/2007 | Rjeily |
| 2008/0095274 A1 | 4/2008 | Becker et al. |
| 2009/0207889 A1 | 8/2009 | Kobayashi et al. |

* cited by examiner

|  | $\Delta f_{ER}$ | $\Delta f_{conv}$ | $f_{RX}$ | $f_{TX}$ |
|---|---|---|---|---|
| t = 0 |  |  | 0 | 0 |
| t = 1 | 100 | 0 | 10 | 0 |
| t = 2 | 90 | -10 | 20 | 0 |
| t = 3 | 80 | -20 | 30 | 0 |
| t = n | 0 | -100 | 100 | 0 |
| t = n+1 | 0 | -100 | 100 | 0 |

FIG. 6

METHOD FOR FREQUENCY OFFSET ESTIMATION AND AUTOMATIC FREQUENCY CONTROL FOR FILTERED SIGNAL WITH DESTROYED PHASE INFORMATION AND SIGNAL TRANSCEIVER

CROSS REFERENCE TO RELATED APPLICATIONS

This application is a continuation of co-pending application Ser. No. 12/178,674 filed on Jul. 24, 2008, which claims the benefit of U.S. Provisional Application No. 61/012,074, filed on Dec. 7, 2007, the entireties of which are incorporated herein by reference.

BACKGROUND OF THE INVENTION

1. Field of the Invention

The invention relates to wireless signal transceivers, and more particularly to frequency offset estimation (FOE) and automatic frequency control (AFC) for a filtered signal with destroyed phase information.

2. Description of the Related Art

Before a raw signal is transmitted, a signal transmitter modulates the raw signal with a carrier wave with a transmitting frequency suitable for air transmission to generate a radio signal. The signal transmitter transmits the radio signal through the air. A signal transceiver then receives the radio signal and demodulates the radio signal with a local wave with a receiving frequency to recover the raw signal. The receiving frequency of the local wave of the signal transceiver is assumed to be equal to the transmitting frequency of the carrier wave of the signal transmitter. However, in practice, there is unavoidably a tiny frequency difference between the receiving frequency of the signal transceiver and the transmitting frequency of the signal transmitter, and the frequency difference, referred to as frequency offset, degrades quality of the recovered raw signal. The signal transceiver therefore estimate a frequency offset for compensation before the recovered raw signal is further processed in the signal transceiver.

When a signal is filtered, the signal is often divided into an inphase component and a quadrature-phase component for further processing. If a filter filters the original signal according to different filter coefficients to obtain an I-component and a Q-component, the phase and frequency information is lost and cannot serve as a source for conventional frequency offset estimation. A conventional frequency offset estimation module therefore estimates a frequency offset value according to the original signal prior to filtration.

Referring to FIG. 1, a block diagram of a signal transceiver 100 comprises a channel estimator 102, an enhanced receiver 104, an equalizer 106, a channel decoder 108, and a conventional frequency estimator 110. The signal transceiver 100 receives an original signal X. The channel estimator 102 estimates a channel response of the original signal X. The enhanced receiver 104 is actually a filter filtering the original signal X to obtain a filtered signal Y with a carrier-to-interference (C/I) ratio higher than that of the original signal X. The equalizer 106 then equalizes the filtered signal Y to obtain an equalized signal Z, and the channel decoder 108 decodes the equalized signal Z to obtain raw data.

The conventional frequency offset estimator 110 estimates a frequency offset value $\Delta f_{conv}$ according to the original signal X prior to filtration as it cannot derive a frequency offset value from the filtered signal Y. The filtered signal Y, however, has a higher C/I ratio than that of the original signal X. The conventional frequency offset estimator 110 may fail to obtain the actual frequency offset value when the interference power becomes large, which might not be the case if utilizing filtered signal Y as the enhanced receiver 104 may effectively suppress certain interference. Since the frequency offset estimator 110 estimates the frequency offset value $\Delta f_{conv}$ based on the original signal X with a low C/I ratio, $\Delta f_{conv}$ is less accurate and cannot properly compensate the frequency drift, which degrades performance of the signal transceiver 100. In addition, when the C/I ratio of the original signal X is very low, the conventional frequency offset estimator 110 estimates a frequency offset value $\Delta f_{conv}$ dominated by the interference frequency offset with an inverse sign of the actual value, which causes divergence of automatic frequency control. The enhanced receiver 104 typically still could be operated at such a low C/I, the conventional frequency offset estimator 110 becomes a bottleneck of the overall transceiver 100.

BRIEF SUMMARY OF THE INVENTION

The invention provides a method for frequency offset estimation according to a filtered signal with destroyed phase and frequency information. In one embodiment, a filter filters an original signal according to a series of first filter coefficients to obtain a first-channel component of the filtered signal, and filters the original signal according to a series of second filter coefficients to obtain a second-channel component of the filtered signal. A series of third filter coefficients are first derived from the first filter coefficients. The original signal is then filtered according to the third filter coefficients to obtain a reference signal. A first frequency offset value is estimated according to an artificial signal composed on the first-channel component of the filtered signal and the reference signal, wherein the first-channel component of the filtered signal is a first-channel component of the artificial signal, and the reference signal is a second-channel component of the artificial signal.

The invention provides a signal transceiver capable of frequency offset estimation according to a filtered signal with destroyed phase information. In one embodiment, the signal transceiver comprises a filter, a reference signal generator, and a frequency offset estimator. The filter filters an original signal according to a series of first filter coefficients to obtain a first-channel component of the filtered signal, and filters the original signal according to a series of second filter coefficients to obtain a second-channel component of the filtered signal. The reference signal generator derives a series of third filter coefficients from the first filter coefficients, and filters the original signal according to the third filter coefficients to obtain a reference signal. The frequency offset estimator then estimates a first frequency offset value according to an artificial signal composed of the first-channel component of the filtered signal and the reference signal, wherein the first-channel component of the filtered signal is a first-channel component of the artificial signal, and the reference signal is a second-channel component of the artificial signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6 is an exemplary result of generation of a transmitting frequency and a receiving frequency according to the automatic frequency control module of FIG. 5.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
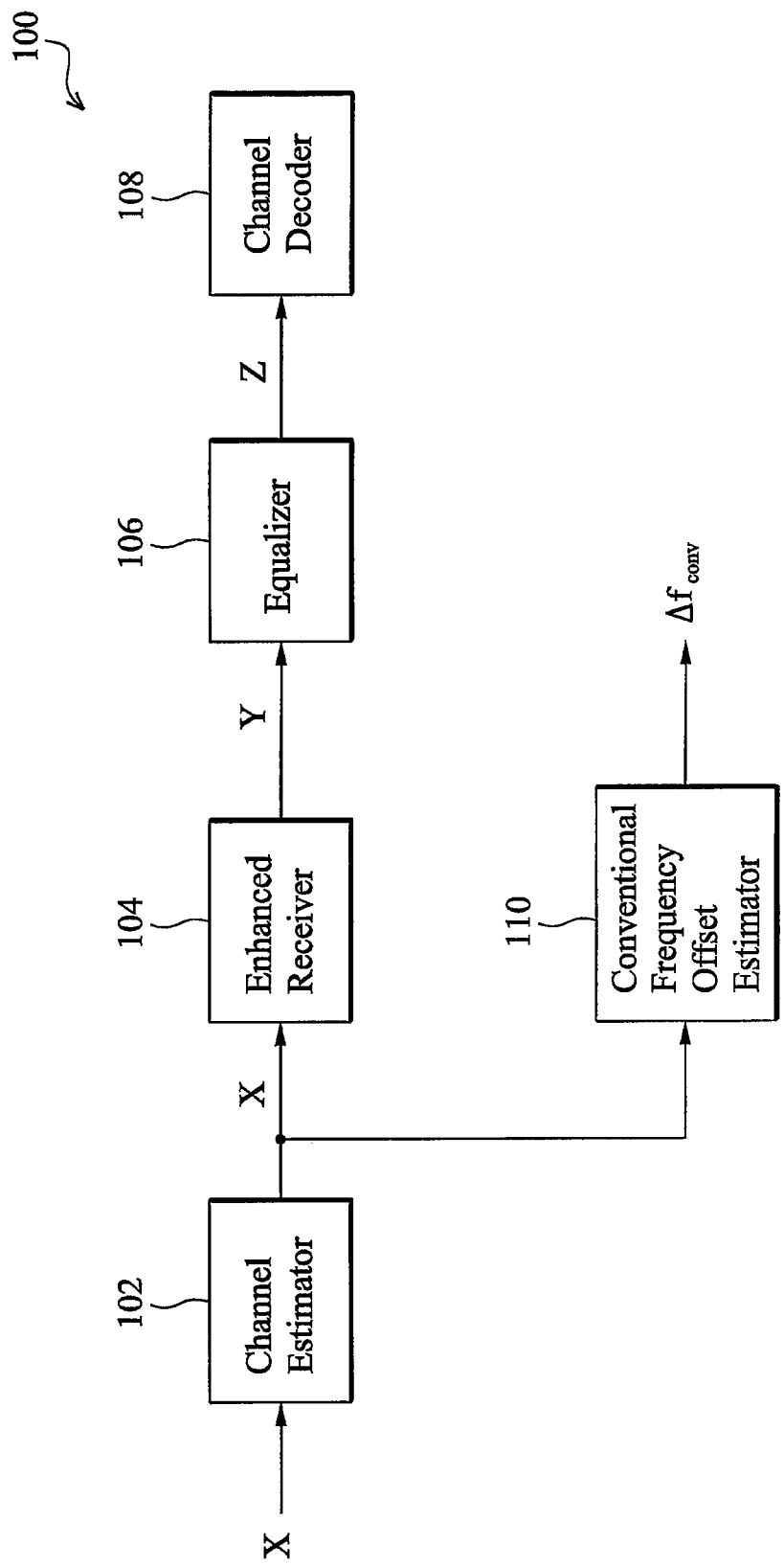
FIG. 1 is a block diagram of a signal transceiver with conventional frequency offset estimation.
Figure 2:
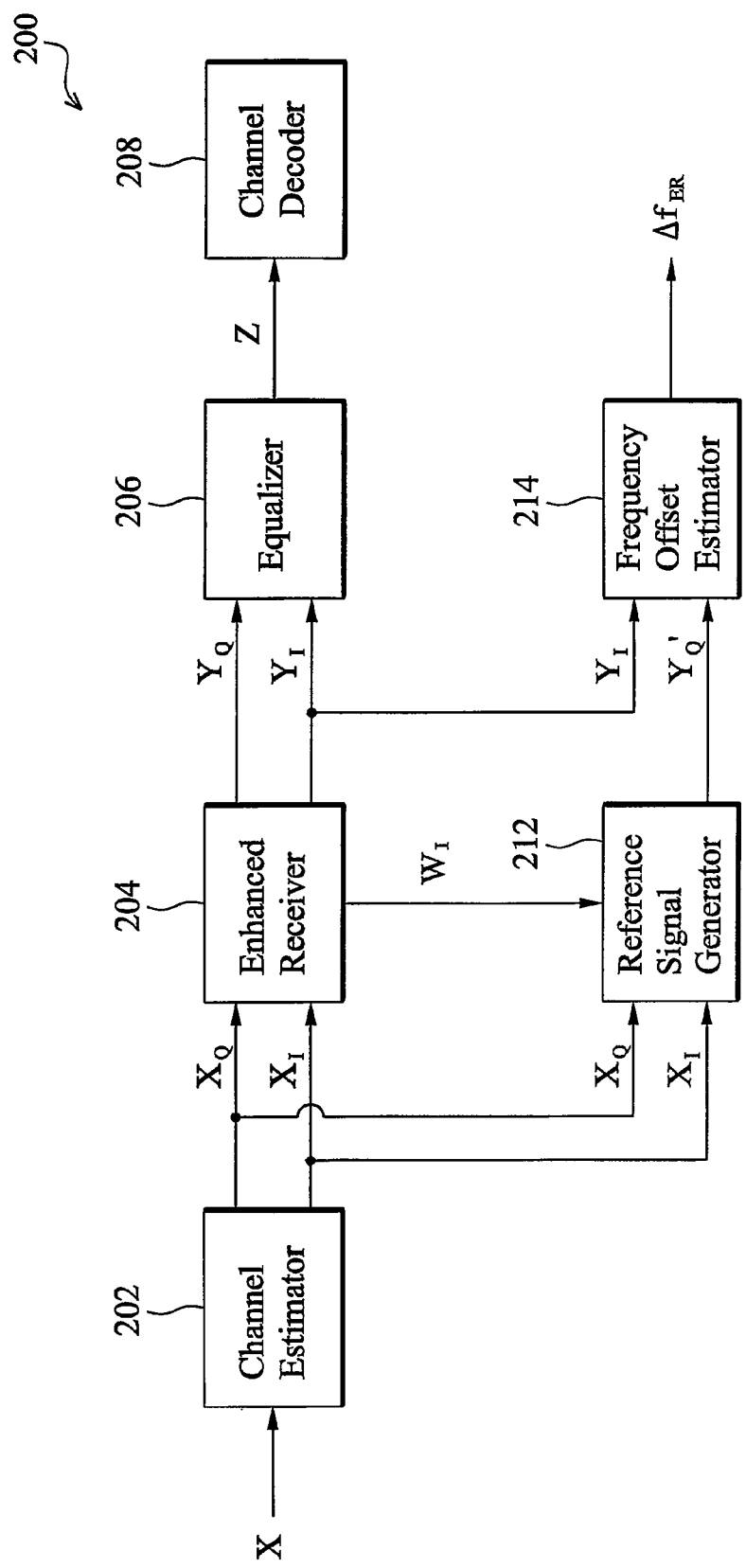
FIG. 2 is a block diagram of a signal processor capable of estimating a frequency offset according to a filtered signal with destroyed phase information according to an embodiment of the invention.

Referring to FIG. 2, a block diagram of a signal processor 200 capable of estimating a frequency offset according to a filtered signal with destroyed phase information according to an embodiment of the invention is shown. The signal processor 200 comprises a channel estimator 202, an enhanced receiver 204, an equalizer 206, a channel decoder 208, a reference signal generator 212, and a frequency offset estimator 214. The signal processor 200 receives an original signal X comprising an inphase component XI and a quadrature-phase component XQ. The channel estimator 202 estimates a channel response according to the original signal X. The enhanced receiver 204 then filters the original signal X to obtain a filtered signal Y with a higher carrier-to-interference ratio than that of the original signal X. In the enhanced receiver 204, the original signal X is filtered with a set of first filter coefficients WI to obtain an inphase component YI of the filtered signal Y, and the original signal X is filtered with a set of second filter coefficients WQ to obtain a quadrature-phase component YQ of the filtered signal Y. The equalizer 206 then equalizes the filtered signal Y to obtain an equalized signal Z, and the channel decoder 208 then decodes the equalized signal Z for further processing.

Because the inphase component $Y_I$ of the filtered signal Y cannot match the quadrature-phase component $Y_Q$ of the filtered signal Y to generate phase information suitable for frequency offset estimation, the reference signal generator 212 generates a reference signal according to the original signal X and the first filter coefficients $W_I$ as a quadrature-phase component matching the inphase component $Y_I$ of the filtered signal Y. The reference signal generator 212 first derives a set of third filter coefficients from the first filter coefficients $W_I$. The reference signal generator 212 then filters the first signal X according to the third filter coefficients to obtain a reference signal $Y_Q'$. The inphase component $Y_I$ of the filtered signal Y is then combined with the reference signal $Y_Q'$ to make up an artificial signal as an input of the frequency offset estimator 214, wherein the inphase component $Y_I$ of the filtered signal Y is taken as an inphase component of the artificial signal and the reference signal $Y_Q'$ is taken as a quadrature-phase component of the artificial signal.

Because the third filter coefficients for generating the reference signal is derived from the first filter coefficients $W_I$ for generating the inphase component $Y_I$ of the filtered signal Y, a phase of the artificial signal is therefore not destroyed, and the frequency offset estimator 214 can estimate a frequency offset value $\Delta f_{ER}$ according to the artificial signal. In some other embodiments, the third filter coefficients for generating the reference signal is derived from the second filter coefficients $W_Q$ for generating the quadrature component $Y_Q$ of the filtered signal Y, and the frequency offset value $\Delta f_{ER}$ is estimated according to an artificial signal composed on the quadrature component $Y_Q$ of the filtered signal Y and the reference signal. It is also possible to derive a frequency offset value from each of the inphase and quadrature components with its reference signal, and determine a final frequency offset value by averaging the two frequency offset values or selecting one from the two. In one embodiment, the frequency offset value $\Delta f_{ER}$ is an inter-burst frequency offset of the filtered signal Y or an intra-burst frequency offset of the filtered signal Y. In addition, because the artificial signal with the inphase component $Y_I$ and the quadrature-phase component $Y_Q'$ has a high C/I ratio, the frequency offset value $\Delta f_{ER}$ derived from the artificial signal is more accurate than the conventional frequency offset value $\Delta f_{conv}$.

An embodiment of the enhanced receiver 204 generates an inphase component $Y_I$ of the filtered signal Y according to the following algorithm:

$$Y_I(k) = \sum_m \left\{ W_{Ia}(m) \times X_I\left(k + \frac{m}{N}\right) + W_{Ib}(m) \times X_Q\left(k + \frac{m}{N}\right) \right\};$$

wherein $X_I$ is an inphase component of the original signal X, $X_Q$ is a quadrature-phase component of the original signal X, $W_{Ia}$ is a series of first multipliers of the first filter coefficients $W_I$ for multiplying the first-channel component $X_I$ of the original signal X, $W_{Ib}$ is a series of second multipliers of the first filter coefficients $W_I$ for multiplying the second-channel component $X_Q$ of the original signal X, m is a filter tap index, N is the oversampling rate, and k is a sample index. Thus, the enhanced receiver 204 filters the original signal ($X_I$, $X_Q$) according to the first filter coefficients ($W_{Ia}$, $W_{Ib}$) to obtain the filtered signal $Y_I$.

In one embodiment, the reference signal generator 212 permutes the first filter coefficients ($W_{Ia}$, $W_{Ib}$) of the enhanced receiver 204 to obtain a set of filter coefficients ($W_{Ib}$, $W_{Ia}$) and then reverses signs of $W_{Ib}$ to obtain a set of third filter coefficients ($-W_{Ib}$, $W_{Ia}$). The reference signal generator 212 then filters the original signal ($X_I$, $X_Q$) according to the third filter coefficients ($-W_{Ib}$, $W_{Ia}$) to obtain the reference signal $Y_Q'$. The reference signal $Y_Q'$ is therefore obtained according to the following algorithm:

$$Y_Q'(k) = \sum_m \left\{ W_{Ia}(m) \times X_Q\left(k + \frac{m}{N}\right) - W_{Ib}(m) \times X_I\left(k + \frac{m}{N}\right) \right\}.$$

Figure 3:
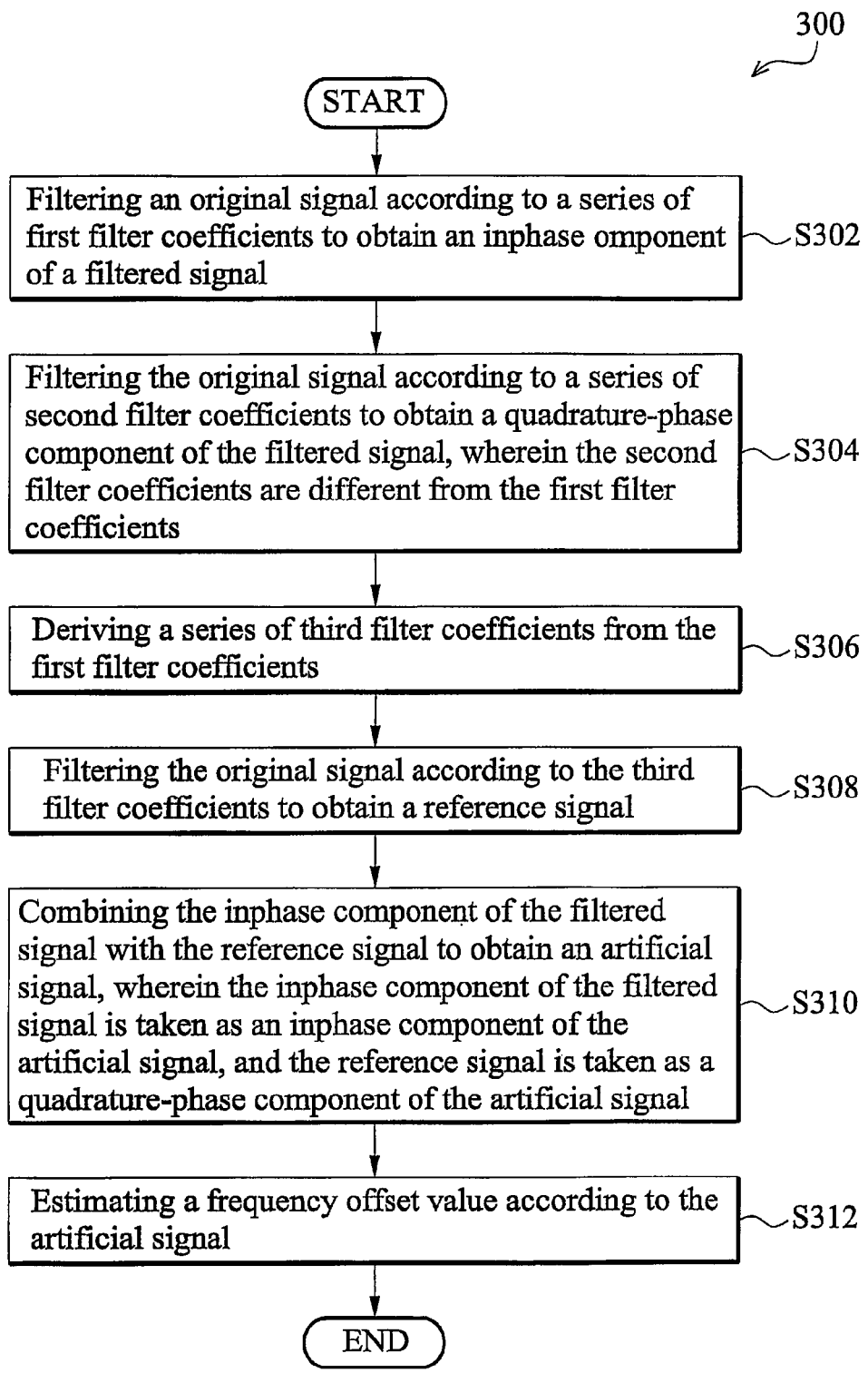
FIG. 3 is a flowchart of a method for frequency offset estimation for a filtered signal with destroyed phase information according to an embodiment of the invention.

Referring to FIG. 3, a flowchart of a method 300 for frequency offset for a filtered signal with destroyed phase information according to an embodiment of the invention is shown. First, an original signal X is filtered according to a series of first filter coefficients $W_I$ to obtain an inphase component $Y_I$ of a filtered signal Y (step 302). The original signal X is also filtered according to a series of second filter coefficients $W_Q$ to obtain a quadrature-phase component $Y_Q$ of the filtered signal Y (step 304), wherein the second filter coefficients $W_Q$ are different from the first filter coefficients $W_I$. A series of third filter coefficients is then derived from the first filter coefficients $W_I$ (step 306). In one embodiment, the third filter coefficients are obtained from a permutation of the first filter coefficients $W_I$ with a reversed sign. The original signal X is then filtered according to the third filter coefficients to obtain a reference signal $Y_Q'$ (step 308). The inphase component $Y_I$ of the filtered signal Y is combined with the reference signal $Y_Q'$ to obtain an artificial signal (step 310), wherein the inphase component $Y_I$ of the filtered signal Y is taken as an inphase component of the artificial signal, and the reference signal $Y_Q'$ is taken as a quadrature-phase component of the artificial signal. Finally, a frequency offset value is estimated according to the artificial signal (step 312), and the filtered signal can be compensated according to the frequency offset value.

Figure 4A:
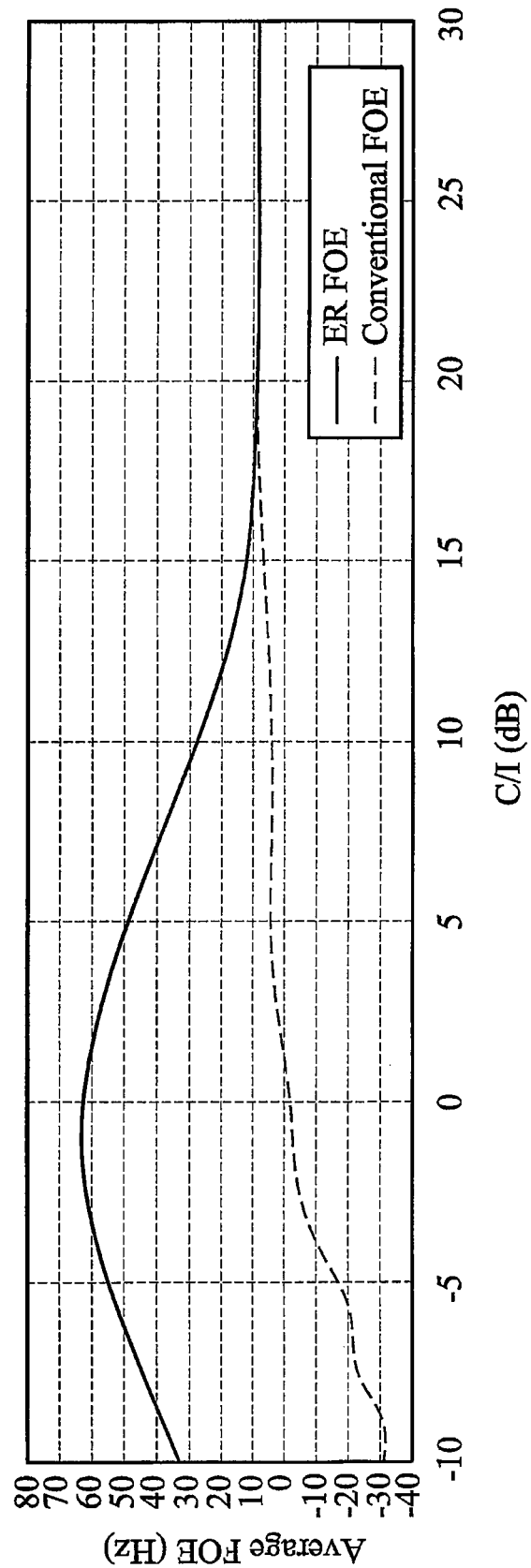
FIG. 4A shows experimental results of frequency offset values versus different carrier-to-interference ratios comparing the enhance receiver (ER) and conventional FOE methods.
Figure 4B:
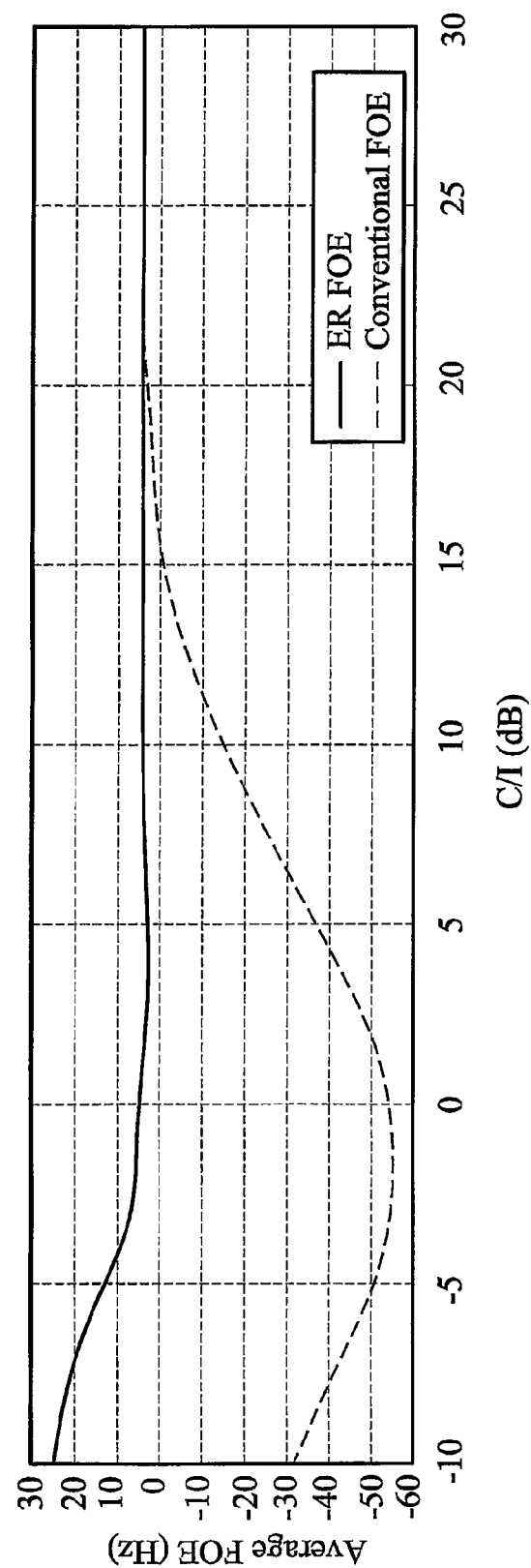
FIG. 4B shows experimental results of frequency offset values versus different carrier-to-interference ratios comparing the enhance receiver (ER) and conventional FOE methods.

Referring to FIG. 4A, a schematic diagram of frequency offset values derived from artificial signals corresponding to different carrier-to-interference (C/I) ratios is shown. In FIG. 4A, the artificial signals for frequency offset estimation are derived from original signals comprising a wanted component with a frequency offset from the base station of 6 Hz and an interference component with a frequency offset from the base station of wanted signal of 100 Hz. A solid line shows the frequency offset estimation values $f_{ER}$ derived from artificial signals according to an embodiment of the invention, and a dotted line shows the conventional frequency offset estimation values $f_{conv}$ derived from original signals. When a C/I ratio is high, both the frequency offset estimation values $f_{ER}$ and the conventional frequency offset estimation values $f_{conv}$ successfully match the 6 Hz frequency of the wanted component. When a C/I ratio is less than 15 dB, the frequency offset estimation values $f_{ER}$ gradually approach the frequency of the interference signal. When a C/I ratio is less than 0 dB, the conventional frequency offset estimation values $f_{conv}$ become negative, leading to greater and greater errors for signal compensation due to divergence of frequency control. The frequency offset estimation values $f_{ER}$, however, are positive when a carrier-to-interference ratio is less than 0 dB, and signal compensation is therefore prevented from divergence. FIG. 4B is another schematic diagram of frequency offset values estimated by the embodiment of the invention (ER FOE) and the conventional FOE, wherein original signals comprise a wanted component with a frequency of 6 Hz and an interference component with a frequency of −100 Hz.

Figure 5:
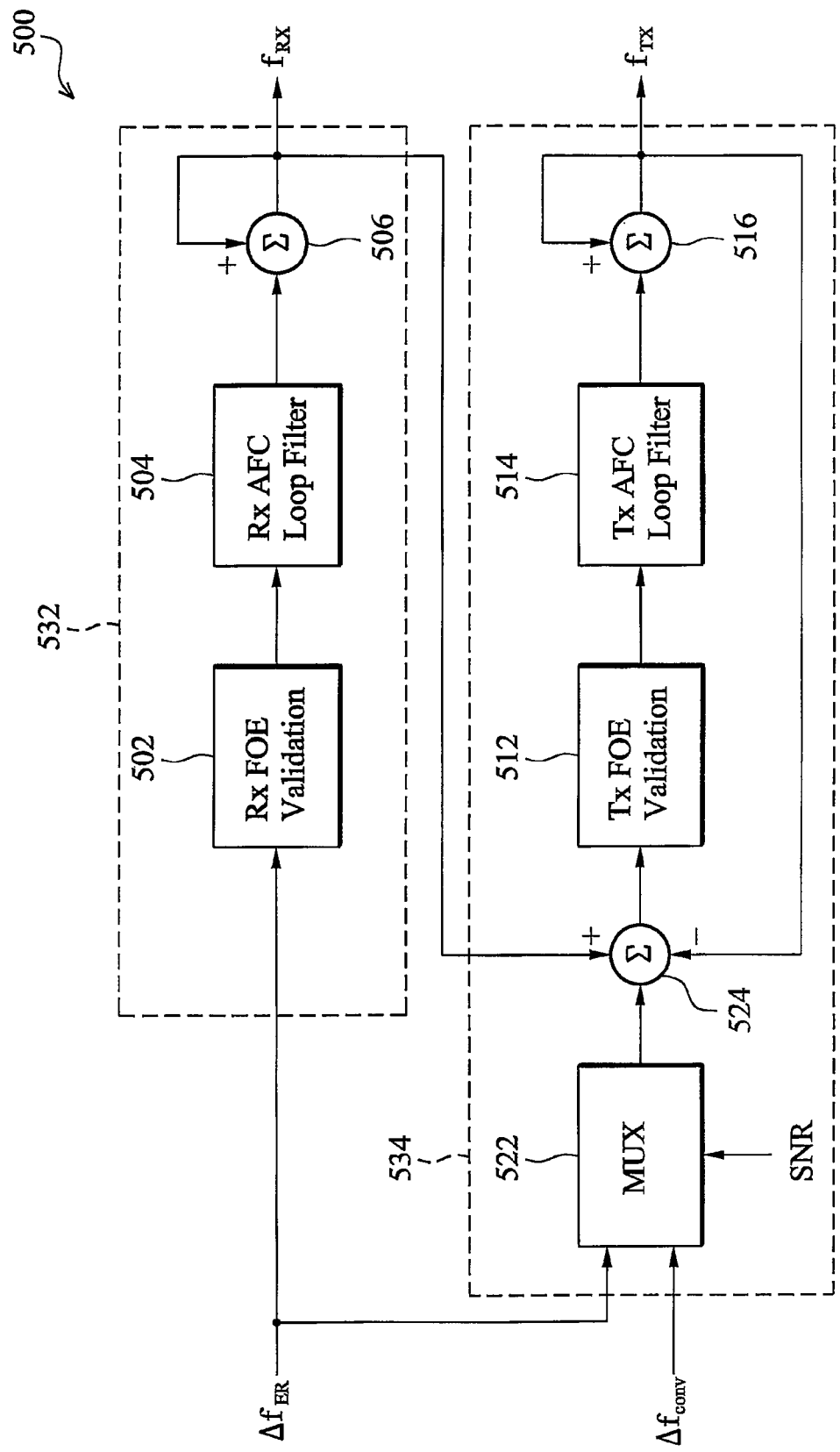
FIG. 5 is a block diagram of an automatic frequency control module for frequency compensation according to an embodiment of the invention.

Referring to FIG. 5, a block diagram of an automatic frequency control (AFC) module 500 for frequency compensation according to an embodiment of the invention is shown. The AFC module 500 comprises a receiving frequency controller 532 and a transmitting frequency controller 534. The receiving frequency controller 532 generates a receiving frequency $f_{Rx}$ for signal reception according to a frequency offset value $\Delta f_{ER}$ generated according to an embodiment of the invention. The transmitting frequency controller 534 generates a transmitting frequency $f_{Tx}$ for signal transmission according to either the frequency offset value $\Delta f_{ER}$ or a conventional frequency offset value $\Delta f_{conv}$. The conventional frequency offset value $\Delta f_{conv}$ can be derived from an original signal X prior to filtration, for example, estimated by maximum likelihood (ML) FOE. The transmitting frequency controller 534 ordinarily generates the transmitting frequency $f_{Tx}$ according to the conventional frequency offset value $\Delta f_{conv}$. When a signal-to-noise ratio of an original signal is lower than a threshold, the conventional frequency offset value $\Delta f_{conv}$ is negative and leads to divergence of the transmitting frequency $f_{Tx}$, as shown in FIGS. 4A and 4B. The transmitting frequency controller 534 therefore generates the transmitting frequency $f_{Tx}$ according to the frequency offset value $\Delta f_{ER}$ generated according to the embodiment of the invention when the signal-to-noise ratio is lower than the threshold.

The receiving frequency controller 532 comprises an Rx FOE validation module 502, an Rx AFC loop filter 504, and an adder 506. After the frequency offset value $\Delta f_{ER}$ passes through the Rx FOE validation module 502 and the Rx AFC loop filter 504, the adder 506 adds the frequency offset value $\Delta f_{ER}$ to a feedback of the receiving frequency $f_{Rx}$ to obtain the receiving frequency $f_{Rx}$. The transmitting frequency controller 534 comprises a multiplexer 522, an adder 524, a Tx FOE validation module 512, a Tx AFC loop filter 514, and an adder 516. When a signal-to-noise ratio SNR is higher than a threshold, the multiplexer 422 selects the conventional frequency offset value $\Delta f_{conv}$ as a transmitting frequency compensation value. When the signal-to-noise ratio SNR is lower than the threshold, the multiplexer 422 selects the frequency offset value $\Delta f_{ER}$ as the transmitting frequency compensation value. The adder 524 first subtracts the transmitting frequency $f_{TX}$ from the receiving frequency $f_{RX}$ to obtain a frequency difference, and then adds the transmitting frequency compensation value to the frequency difference to obtain a frequency signal. After the frequency signal passes through the Tx FOE validation module 512 and the Tx AFC loop filter 514, the adder 516 adds the frequency signal to a feedback of the transmitting frequency $f_{Tx}$ to obtain the transmitting frequency $f_{Tx}$. Please note that signal-to-noise ratio is only an example for determining which frequency offset ($\Delta f_{ER}$ or $\Delta f_{conv}$) should be used for the transmitting frequency controller 534, other measurements or index indicating the environmental conditions can replace the signal-to-noise ratio of this embodiment.

Referring to FIG. 6, a hypothetical result of generation of a transmitting frequency $f_{Tx}$ and a receiving frequency $f_{Rx}$ according to the AFC module 500 of FIG. 5 is shown. An original signal is assumed to comprise a wanted component with a frequency of 0 Hz and an interference component with a frequency of 100 Hz. At time $t_0$, the receiving frequency $f_{Rx}$ has an initial value of 0 Hz, and the transmitting frequency $f_{Tx}$ has an initial value of 0 Hz. The frequency offset estimator 214 and the conventional frequency offset estimator 110 then respectively generates the frequency offset value $\Delta f_{ER}$ and the conventional frequency offset value $\Delta f_{conv}$. When a carrier-to-interference ratio or a signal-to-noise ratio is not very low, the receiving frequency controller 532 generates a receiving frequency $f_{Rx}$ converging to the 100 Hz frequency of the interference component at time $t_n$, and a transmitting frequency controller 534 generates a transmitting frequency $f_{Tx}$ converging to the 0 Hz frequency of the wanted component at time $t_n$. If the signal-to-noise ratio decreases to a value lower than a threshold, the conventional frequency offset estimator 110 will generate a conventional frequency offset value $\Delta f_{conv}$ with an inverse sign, which leads to a divergence of the transmitting frequency $f_{Tx}$. The transmitting frequency controller 534 therefore generates the transmitting frequency $f_{Tx}$ according to the frequency offset value $\Delta f_{ER}$ instead of the conventional frequency offset value $\Delta f_{conv}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for frequency offset estimation for a filtered signal with destroyed phase information, wherein a filter filters an original signal according to a series of first filter coefficients to obtain a first-channel component of the filtered signal, comprising:

deriving a series of third filter coefficients from the first filter coefficients;

filtering the original signal according to the third filter coefficients to obtain a reference signal;

estimating a first frequency offset value, based on an artificial signal, according to the first-channel component of the filtered signal and the reference signal.

2. The method as claimed in claim 1, wherein the first-channel component of the filtered signal is an inphase component of the filtered signal, and the first frequency offset value is calculated from the artificial signal, wherein an inphase component of the artificial signal is the inphase component of the filtered signal, and a quadrature-phase component of the artificial signal is a quadrature-phase component of the reference signal.

3. The method as claimed in claim 1, wherein derivation of the third filter coefficients comprises:

permuting the first filter coefficients to obtain the third filter coefficients; and reversing signs of at least one of the third filter coefficients.

4. The method as claimed in claim 1, wherein the first frequency offset value is an inter-burst frequency offset of the filtered signal or an intra-burst frequency offset of the filtered signal.

5. The method as claimed in claim 1, wherein the first filter coefficients comprise a series of first multipliers for multiplying the first-channel component of the original signal and a series of second multipliers for multiplying a second-channel component of the original signal, and derivation of the third filter coefficients comprises:

taking the first multipliers as a series of third multipliers of the third filter coefficients for multiplying the second-channel component of the original signal;

taking the second multipliers as a series of fourth multipliers of the third filter coefficients for multiplying the first-channel component of the original signal; and reversing signs of the fourth multipliers.

6. The method as claimed in claim 5, wherein the filter generates the first-channel component of the filtered signal according to the following algorithm:

$$Y_I(k) = \sum_m \left\{ W_{Ia}(m) \times X_I\left(k + \frac{m}{N}\right) + W_{Ib}(m) \times X_Q\left(k + \frac{m}{N}\right) \right\};$$

wherein YI is the first-channel component of the filtered signal, XI is the first-channel component of the original signal, XQ is the second-channel component of the original signal, WIa is the first multiplier, WIb is the second multiplier, m is a filter tap index, N is the over-sampling rate, and k is a sample index;

and the reference signal is determined according to the following algorithm:

$$Y'_Q(k) = \sum_m \left\{ W_{Ia}(m) \times X_Q\left(k + \frac{m}{N}\right) - W_{Ib}(m) \times X_I\left(k + \frac{m}{N}\right) \right\};$$

wherein YQ' is the reference signal, XI is the first-channel component of the original signal, XQ is the second-channel component of the original signal, WIa is the third multiplier equal to the first multiplier, and −WIb is the fourth multiplier equal to a negative opposite of the second multiplier, m is a filter tap index, N is the over-sampling rate, and k is a sample index.

7. The method as claimed in claim 1, wherein the method further comprises:

estimating a second frequency offset value according to the original signal;

selecting a transmitting frequency compensation value from the first frequency offset value and the second frequency offset value according to an environmental condition of the original signal; and compensating a transmitting frequency for signal transmission according to the transmitting frequency compensation value.

8. The method as claimed in claim 7, wherein the environmental condition is measured by signal-to-noise ratio, and selection of the transmitting frequency compensation value comprises:

selecting the second frequency offset value as the transmitting frequency compensation value when the signal-to-noise ratio is greater than a threshold; and selecting the first frequency offset value as the transmitting frequency compensation value when the signal-to-noise ratio is less than the threshold.

9. The method as claimed in claim 8, wherein the method further comprises compensating a receiving frequency for signal reception according to the first frequency offset value.

10. The method as claimed in claim 7, wherein compensation of the transmitting frequency comprises:

adding the transmitting frequency compensation value to a difference between a receiving frequency and the transmission frequency to obtain a frequency signal; and adding a feedback of the transmitting frequency to the frequency signal to obtain the transmitting frequency.

11. A signal transceiver capable of frequency offset estimation for a filtered signal with destroyed phase information, comprising:

a filter, filtering an original signal according to a series of first filter coefficients to obtain a first-channel component of the filtered signal;

a reference signal generator, deriving a series of third filter coefficients from the first filter coefficients, and filtering the original signal according to the third filter coefficients to obtain a reference signal; and a frequency offset estimator, estimating a first frequency offset value according to the first-channel component of the filtered signal and the reference signal.

12. The signal transceiver as claimed in claim 11, wherein the first channel component of the filtered signal is an inphase component of the filtered signal, and the first frequency offset value is calculated from an artificial signal, wherein an inphase component of the artificial signal is the inphase component of the filtered signal, and a quadrature-phase component of the artificial signal is a quadrature-phase component of the reference signal.

13. The signal transceiver as claimed in claim 11, wherein the reference signal generator permutes the first filter coefficients to obtain the third filter coefficients, and reverses signs of some of the third filter coefficients, thereby deriving the third filter coefficients.

14. The signal transceiver as claimed in claim 11, wherein the first frequency offset value is an inter-burst frequency offset of the filtered signal or an intra-burst frequency offset of the filtered signal.

15. The signal transceiver as claimed in claim 11, wherein the first filter coefficients comprise a series of first multipliers for multiplying the first-channel component of the original signal and a series of second multipliers for multiplying a second-channel component of the original signal, and the reference signal generator multiplies the second-channel component of the original signal by the first multipliers to obtain a series of first value, multiplies the first-channel component of the original signal by the second multipliers to obtain a series of second values, and then sums differences between the first values and the second values to obtain the reference signal.

16. The signal transceiver as claimed in claim 15, wherein the filter generates the first-channel component of the filtered signal according to the following algorithm:

$$Y_I(k) = \sum_m \left\{ W_{Ia}(m) \times X_I\left(k + \frac{m}{N}\right) + W_{Ib}(m) \times X_Q\left(k + \frac{m}{N}\right) \right\};$$

wherein YI is the first-channel component of the filtered signal, XI is the first-channel component of the original signal, XQ is the second-channel component of the original signal, WIa is the first multiplier, WIb is the second multiplier, m is a filter tap index, N is the oversampling rate, and k is a sample index;
and the reference signal generator generates the reference signal according to the following algorithm:

$$Y'_Q(k) = \sum_m \left\{ W_{Ia}(m) \times X_Q\left(k + \frac{m}{N}\right) - W_{Ib}(m) \times X_I\left(k + \frac{m}{N}\right) \right\};$$

wherein YQ' is the reference signal, XI is the first-channel component of the original signal, XQ is the second-channel component of the original signal, WIa is the first multiplier, and −WIb is a negative opposite of the second multiplier, m is a filter tap index, N is the oversampling rate, and k is a sample index.

17. The signal transceiver as claimed in claim 11, wherein the signal transceiver further comprises:
a second frequency offset estimator, estimating a second frequency offset value according to the original signal;
a receiving frequency controller, compensating a receiving frequency for signal reception according to the first frequency offset value; and
a transmitting frequency controller, compensating a transmitting frequency for signal transmission with the first frequency offset value or the second frequency offset value according to an environmental condition of the original signal.

18. The signal transceiver as claimed in claim 17, wherein the environmental condition is measured by signal-to-noise ratio, and the transmitting frequency controller comprises:
a multiplexer, selecting the second frequency offset value as a transmitting frequency compensation value when the signal-to-noise ratio is greater than a threshold, and selecting the first frequency offset value as the transmitting frequency compensation value when the signal-to-noise ratio is less than the threshold; and
a feedback loop, compensating the transmitting frequency according to the transmitting frequency compensation value.

19. The signal transceiver as claimed in claim 18, wherein the feedback loop comprises:
a first adder, adding the transmitting frequency compensation value to a difference between a receiving frequency and the transmission frequency to obtain a frequency signal; and
a second adder, adding a feedback of the transmitting frequency to the frequency signal to obtain the transmitting frequency.

20. The signal transceiver as claimed in claim 17, wherein the receiving frequency controller comprises a third adder adding the first frequency offset value to a feedback of the receiving frequency to obtain the receiving frequency.

21. A method for automatic frequency control, comprising:
selecting a transmitting frequency compensation value from a first frequency offset value and a second frequency offset value according to a signal-to-noise ratio (SNR); and
compensating a transmitting frequency for signal transmission according to the transmitting frequency compensation value;
wherein selection of the transmitting frequency compensation value comprises:
selecting the second frequency offset value as the transmitting frequency compensation value when the signal-to-noise ratio is greater than a threshold; and
selecting the first frequency offset value as the transmitting frequency compensation value when the signal-to-noise ratio is less than the threshold.

22. The method as claimed in claim 21, wherein the method further comprises compensating a receiving frequency for signal reception according to the first frequency offset value.

23. The method as claimed in claim 21, wherein compensation of the transmitting frequency comprises:
adding the transmitting frequency compensation value to a difference between a receiving frequency and the transmission frequency to obtain a frequency signal; and
adding a feedback of the transmitting frequency to the frequency signal to obtain the transmitting frequency.

24. The method as claimed in claim 21, further comprising:
filtering an original signal according to a series of first filter coefficients to obtain a first-channel component of a filtered signal;
filtering the original signal according to a series of third filter coefficients to obtain a reference signal, wherein the series of third filter coefficients is derived from the series of first filter coefficients;
estimating a first frequency offset value according to the first-channel component of the filtered signal and the reference signal; and
estimating a second frequency offset value according to the original signal.

25. A signal transceiver capable of automatic frequency control, comprising:
a transmitting frequency controller, comprising:
a multiplexer, selecting a transmitting frequency compensation value from a first frequency offset value and a second frequency offset value according to a signal-to-noise ratio (SNR); and
a feedback loop, compensating a transmitting frequency for signal transmission according to the transmitting frequency compensation value; and a receiving frequency controller, compensating a receiving frequency for signal reception according to the first frequency offset value;

wherein the receiving frequency controller comprises a third adder adding the first frequency offset value to a feedback of the receiving frequency to obtain the receiving frequency.

26. The signal transceiver as claimed in claim 25, wherein the signal transceiver further comprises:
- a filter, filtering an original signal according to a series of first filter coefficients to obtain a first-channel component of the filtered signal;
- a reference signal generator, deriving a series of third filter coefficients from the first filter coefficients, and filtering the original signal according to the third filter coefficients to obtain a reference signal;
- a frequency offset estimator, estimating the first frequency offset value according to the first-channel component of the filtered signal and the reference signal; and
- a second frequency offset estimator, estimating the second frequency offset value according to the original signal.

27. The signal transceiver as claimed in claim 25, wherein the multiplexer of the transmitting frequency controller selects the second frequency offset value as the transmitting frequency compensation value when the signal-to-noise ratio is greater than a threshold, and selecting the first frequency offset value as the transmitting frequency compensation value when the signal-to-noise ratio is less than the threshold.

28. The signal transceiver as claimed in claim 25, wherein the feedback loop comprises:
- a first adder, adding the transmitting frequency compensation value to a difference between a receiving frequency and the transmission frequency to obtain a frequency signal; and
- a second adder, adding a feedback of the transmitting frequency to the frequency signal to obtain the transmitting frequency.

* * * * *